(12) United States Patent
Chen et al.

(10) Patent No.: US 8,907,654 B2
(45) Date of Patent: Dec. 9, 2014

(54) POWER SUPPLY DEVICE OF ELECTRONIC EQUIPMENT AND POWER SUPPLY METHOD THEREOF

(75) Inventors: Wei Gang Chen, Shanghai (CN); Feng Du, Shanghai (CN); Ying Zong Min, Shanghai (CN); Yue Zhuo, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 263 days.

(21) Appl. No.: 13/482,085

(22) Filed: May 29, 2012

(65) Prior Publication Data

US 2012/0306473 A1 Dec. 6, 2012

(30) Foreign Application Priority Data

May 30, 2011 (CN) .......................... 2011 1 0143333

(51) Int. Cl.
*H01F 38/28* (2006.01)
*H02M 3/156* (2006.01)

(52) U.S. Cl.
CPC .................................. *H02M 3/156* (2013.01)
USPC ........................................................ 323/358

(58) Field of Classification Search
CPC .............................. H02M 3/156; H01F 38/28
USPC .................. 323/265, 266, 355, 357, 358, 351
See application file for complete search history.

(56) References Cited

U.S. PATENT DOCUMENTS

2003/0227280 A1* 12/2003 Vinciarelli .................... 323/265

FOREIGN PATENT DOCUMENTS

CN 101083438 A 12/2007

OTHER PUBLICATIONS

Chinese priority document CN 201110143333.6 filed May 30, 2011 (not yet published).

* cited by examiner

*Primary Examiner* — Adolf Berhane
*Assistant Examiner* — Yemane Mehari
(74) *Attorney, Agent, or Firm* — Harness, Dickey & Pierce, P.L.C.

(57) ABSTRACT

A power supply device is disclosed for use in electronic equipment. In an embodiment, the power supply device includes: a current transformer with N secondary winding parts connected in series, an energy storage capacitor and a winding selector, in which N is an integral number and N≥2, wherein the winding selector selectively enables one or more serially connected winding parts of the N secondary winding parts to output an electrical current, in response to a state signal indicating the operating state of the electronic equipment; and the energy storage capacitor is charged by the output current, and supplies power to a main circuit of the electronic equipment. In the embodiments of the present invention, there is also provided corresponding electronic equipment and a corresponding method. By way of the embodiments of the present invention, it is possible to supply electrical energy at relatively low power loss.

11 Claims, 6 Drawing Sheets

POWER SUPPLY DEVICE OF ELECTRONIC EQUIPMENT AND POWER SUPPLY METHOD THEREOF

PRIORITY STATEMENT

The present application hereby claims priority under 35 U.S.C. §119 to Chinese patent application number CN 201110143333.6 filed May 30, 2011, the entire contents of which are hereby incorporated herein by reference.

FIELD

The present invention generally relates to the technical field of electronics and, particularly, to a power supply device in electronic equipment and/or a method to realize power supply thereof and electronic equipment using the power supply device.

BACKGROUND

Currently, lots of electronic equipment uses power supply devices based on a current transformer, which power supply devices at least include a current transformer and an energy storage capacitor. When the electronic equipment is switched on, the secondary winding of the current transformer in the power supply device outputs an electrical current to activate the energy storage capacitor and start to charge the same. Afterwards, the output voltage of the energy storage capacitor can supply power to a main circuit of the electronic equipment (other circuits except the power supply device, such as a signal processing circuit, etc.). For example, in the power distribution system, the electronic protection devices provided in switch devices such as Molded Case Circuit Breaker (MCCB) and Air Circuit Breaker (ACB), etc. are all equipped with the power supply device based on the current transformer. For example, the electronic protection device described here can be an Electronic Tripping Unit (ETU) or a Residual Current Device (RCD), etc.

However, because the current transformer of the power supply device only includes one two-lead secondary winding, when the electronic equipment is activated and enters the normal operating state, the current output by the secondary winding of the current transformer is substantially constant. As such, the following problems will appear: if the number of turns of the secondary winding is set relatively large, then when the electronic equipment is activated, the current output by the secondary winding is so small that the activation time of the main circuit is relatively long. However, if the number of turns of the secondary winding is set relatively small so as to ensure a relatively short activation time of the main circuit, then when the electronic equipment is activated and enters the normal operating state, the electrical energy (i.e. output voltage) output by the energy storage capacitor in the power supply device still maintains a relatively high level, but at this moment, the electrical energy needed in the main circuit will decrease significantly, thereby wasting abundant electrical energy.

SUMMARY

Disclosed is a power supply device in an electronic protection device, a method for realizing power supply there of, and an electronic protection device using the power supply device in the embodiments of the present invention.

A power supply device in electronic equipment is proposed in the embodiments of the present invention, which power supply device includes: a current transformer with N secondary winding parts connected in series, an energy storage capacitor and a winding selector, with N being an integral number and N≥2, wherein the winding selector selectively enables one or more serially connected winding parts of the N secondary winding parts to output an electrical current, in response to a state signal indicating the operating state of the electronic equipment; and the energy storage capacitor is charged by the output current, and supplies power to a main circuit of the electronic equipment. When the electronic equipment is supplied by this power supply device, the number of the secondary winding parts connected in series which output the current can be adjusted according to the operating state of the electronic equipment, and in turn a current with suitable magnitude can be provided according to the actual operating state of the electronic equipment, thereby not only increasing the power supply efficiency but also significantly decreasing the waste of electrical energy.

In an embodiment of the above power supply device, the winding selector enables a first number of the secondary winding parts connected in series to output the current, in response to a first state signal indicating that the electronic equipment is an activated state; the winding selector enables a second number of the secondary winding parts connected in series to output the current, in response to a second state signal indicating that the electronic equipment is a normal operating state, wherein the first number is smaller than the second number. When the electronic equipment is supplied by this power supply device, the electronic equipment can be activated within a relatively short time, and the current can be adjusted to a lower level after the electronic equipment enters the normal operating state, so as to avoid the waste of electrical energy.

In an embodiment of the above power supply device, the winding selector enables a third number of the secondary winding parts connected in series to output the current, in response to a third state signal indicating that an inrush overload is occurring to the electronic equipment, wherein the third number is smaller than the second number. When the electronic equipment is supplied by this power supply device, the current can further be adjusted to a higher level when an inrush overload occurs to the electronic equipment, so that the electronic equipment quickly accomplishes its protective function.

In an embodiment of the above power supply device, the N secondary winding parts are connected in series in the sequence from the first secondary winding part to the Nth secondary winding part; and there are M current output paths, in which there is a first current output path and M−1 second current output paths, wherein the first current output path is coupled to a current output end of the Nth secondary winding part; the M−1 second current output paths are coupled respectively to M−1 junctions of N−1 junctions between adjacent secondary winding parts, wherein M is an integral number greater than or equal to 2 and smaller than or equal to N; and the winding selector selectively enables one of the M current output paths to output the current, in response to the above state signal. This power supply device can accomplish transfer among the current output paths corresponding to different numbers of the secondary windings according to the operating state of the electronic equipment, and can adjust the magnitude of the current when the operating state of the electronic equipment changes.

In an embodiment of the above power supply device, the winding selector includes M switches, wherein a first switch is disposed on the first current output path described above, and M−1 second switches are disposed on the M−1 second current output paths described above; and at any time point, only one of the M switches is switched on, while the other M−1 switches are switched off. This power supply device can quickly accomplish fast transfer among the current output paths by controlling the switches on the current output paths corresponding to different numbers of secondary windings according to the operating state of the electronic equipment, and in turn can promptly adjust the magnitude of the current when the operating state of the electronic equipment changes.

In an embodiment of the above power supply device, the N secondary winding parts described above can be N independent secondary windings, and each of the secondary windings includes two leads. Alternatively, the N secondary winding parts described above can consist totally of N secondary winding parts of one or more secondary windings with a plurality of leads. Preferably, N is 2, for example, the secondary winding parts are two independent two-lead winding parts, or they can be two winding parts of a single three-lead winding. This power supply device can utilize various types of secondary windings to realize dynamic adjustment of the output current, which is easy to achieve and low in costs.

Also proposed in the embodiments of the present invention is electronic equipment, which electronic equipment includes: any one of the power supply devices described above, and a main circuit. Due to the use of the power supply device described above in this electronic equipment, the supply current thereof can be adjusted accordingly when the electronic equipment enters different operating states, so that the efficiency thereof is increased and the waste of electrical energy is significantly reduced.

Also proposed in the embodiments of the present invention is a method for supplying power by a power supply device to electronic equipment, which power supply device includes: a current transformer with N secondary winding parts connected in series, and an energy storage capacitor, with N being an integral number and N≥2; and the method includes: selectively enabling one or more serially connected winding parts of the N secondary winding parts to output an electrical current, in response to a state signal indicating the operating state of the electronic equipment; and charging the energy storage capacitor by the output current, and supplying power to a main circuit of the electronic equipment. When this method is used to supply power to the electronic equipment, the number of the secondary winding parts connected in series which output the current can be adjusted according to the operating state of the electronic equipment, and in turn a current with suitable magnitude can be provided according to the actual operating state of the electronic equipment, thereby not only increasing the efficiency of power supply but also significantly decreasing the waste of electrical energy.

In an embodiment of the above method, a first number of the secondary winding parts connected in series are enabled to output the current, in response to a first state signal indicating that the electronic equipment is in an activated state; and a second number of the secondary winding parts connected in series are enabled to output the current, in response to a second state signal indicating that the electronic equipment is in a normal operating state, wherein the first number is smaller than the second number. When this method is used to supply power to the electronic equipment, the electronic equipment can be activated within a relatively short time, and the current can be adjusted to a lower level after the electronic equipment enters the normal operating state, so as to avoid the waste of electrical energy.

In an embodiment of the above method, a third number of the secondary winding parts connected in series are enabled to output the current, in response to a third state signal indicating that an inrush overload is occurring to the electronic equipment, wherein the third number is smaller than the second number. When this method is used to supply power to the electronic equipment, the current can further be adjusted to a higher level when an inrush overload occurs to the electronic equipment, so that the electronic equipment quickly accomplishes its protective function.

In an embodiment of the above method, the N secondary winding parts in the power supply device are connected in series in the sequence from the first secondary winding part to the Nth secondary winding part; and there are M current output paths in the power supply device, wherein a first current output path is coupled to a current output end of the Nth secondary winding part; the M−1 current output paths are coupled respectively to M−1 out of N−1 junctions between adjacent secondary winding parts, with M being an integral number greater than or equal to 2 and smaller than or equal to N; and the power supply device selectively enables a first current output path and one of the M−1 current output paths to output the current, in response to the state signal described above. This method can accomplish transfer among the current output paths corresponding to different numbers of secondary windings according to the operating state of the electronic equipment, and can adjust the magnitude of the current when the operating state of the electronic equipment changes.

In an embodiment of the above method, the electronic equipment is an electronic protection device, and the main circuit includes a signal processing circuit and an actuator control circuit; the energy storage capacitor is charged by the current output by the first number of secondary winding parts and activates the signal processing circuit, in response to the first state signal; the energy storage capacitor is charged by the current output by the second number of secondary winding parts and provides an operating voltage to the signal processing circuit, in response to the second state signal; and the energy storage capacitor is charged by the current output by the third number of secondary winding parts, activates the actuator control circuit, and provides an operating voltage to the signal processing circuit, in response to the third state signal. When this method is used to supply power to the electronic equipment, the electronic protection device can be activated within a relatively short time, and the waste of electrical energy can be avoided when it is operating normally, and during an inrush overload, the tripping protection thereof can be achieved quickly.

Also proposed in the embodiments of the present invention is a machine readable storage medium, for storing instructions for a machine to carry out the above method for supplying power by a power supply device.

Also proposed in the embodiments of the present invention is a computer program, and when the computer program is executed on a machine, it enables the machine to carry out the above method for supplying power by a power supply device.

By way of the power supply device, method and electronic equipment provided by the embodiments of the present invention, it is possible to supply power with relatively high efficiency at low power loss.

BRIEF DESCRIPTION OF THE DRAWINGS

The above description and other features and advantages of the present invention will become clearer to those skilled in the art by describing the example embodiments of the present invention in conjunction with the accompanying drawings in detail, in which.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EXAMPLE EMBODIMENTS

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In order to provide a supply current with suitable magnitude according to the current demand of the electronic equipment, a power supply device in electronic equipment is proposed by the present invention, which power supply device includes: a current transformer with N series secondary winding parts, an energy storage capacitor and a winding selector, with N being an integral number and N≥2. The winding selector selectively enables one or more series winding parts of the N secondary winding parts to output an electrical current, in response to a state signal indicating the operating state of the electronic equipment; and the energy storage capacitor is charged by the output current, and supplies power to a main circuit of the electronic equipment. Accordingly, when this power supply device is used to supply power to the electronic equipment, it can adjust the number of the secondary winding parts connected in series which output the current according to the operating state of the electronic equipment, then can provide a current with suitable magnitude according to the actual operating state of the electronic equipment, thus the power supply efficiency can be improved and the waste of electrical energy can be significantly reduced.

The above design idea of the present invention will now be described by way of a simple embodiment. In this embodiment, two secondary winding parts are included in the power supply device, such as two two-lead secondary winding parts or one three-lead secondary winding part, i.e. N=2. However, those skilled in the art can understand that the number of the secondary winding parts can be selected according to the demand, for example, when the electronic equipment has a plurality of different operating states and a current with different magnitude is needed in each state, the corresponding number of the secondary winding parts can be selected, such as 3, 4 or more. The particular implementation principle of a power supply device including two secondary winding parts will be described in detail hereinafter. It is apparent for those skilled in the art that the principle of the present invention described in the following also can be applied in the case of other numbers of secondary winding parts.

In one embodiment of the present invention, the power supply device at least includes: a current transformer having two two-lead secondary windings, a rectifying module, an energy storage capacitor and a winding selector. Among them, the winding selector is disposed between the current transformer and the energy storage capacitor; in this embodiment, the output voltage of the energy storage capacitor supplies power to the main circuit of an electronic protection device, and herein the main circuit of the electronic protection device can include at least one functional circuit, such as a signal processing circuit, an actuator control circuit, etc., and the voltage regulator in the electronic protection device can draw a voltage from the output voltage of the energy storage capacitor to supply power to the signal processing circuit. When the electronic protection device is activated, the electronic protection device is connected to the main power line, the winding selector makes one of two secondary windings of the current transformer output a current to activate the energy storage capacitor and start to charge the energy storage capacitor; at this moment, the output voltage of the energy storage capacitor is so high that it can satisfy the demand for activating the electronic protection device; when the electronic protection device is activated and enters the normal operating state, the winding selector connects the two secondary windings of the current transformer in series so as to output a current which can continuously charge the energy storage capacitor, and at this moment, the output voltage of the energy storage capacitor will be lowered. In addition, when the electronic protection device enters the normal operating state, the case of inrush overload may also occur, and in this case, the electronic protection device needs a relatively high electrical energy to carry out the protective function, such as tripping, etc.; at this moment, the winding selector can make one of the two secondary windings of the current transformer output a current again, which can increase the output voltage of the energy storage capacitor so as to satisfy the demand for carrying out the tripping function.

In the above power supply device, the rectifying module includes two rectifiers respectively connected to the above two secondary windings, and the winding selector includes two switches. In this case, the two switches are disposed between the above two rectifiers and the energy storage capacitor, with each of the rectifiers rectifying the output current of the secondary winding connected thereto, and these two switches making one of the above two windings output a current to the energy storage capacitor or connecting the above two windings in series to output a current.

The above power supply device also can further include a current bypass module disposed between the above winding selector and the above energy storage capacitor, wherein the current bypass module can connect the bypass channel to make the energy storage capacitor short-circuit when the output voltage of the energy storage capacitor reaches a predetermined threshold so as to stop outputting the current from the winding selector to the energy storage capacitor and further stop charging the energy storage capacitor; furthermore, the current bypass module can also disconnect the bypass channel to make the energy storage capacitor not short-circuit when the output voltage of the energy storage capacitor is lower than a predetermined threshold so as to output the current from the winding selector to the energy storage capacitor and further charge the energy storage capacitor and increase the output voltage of the energy storage capacitor.

Figure 1:
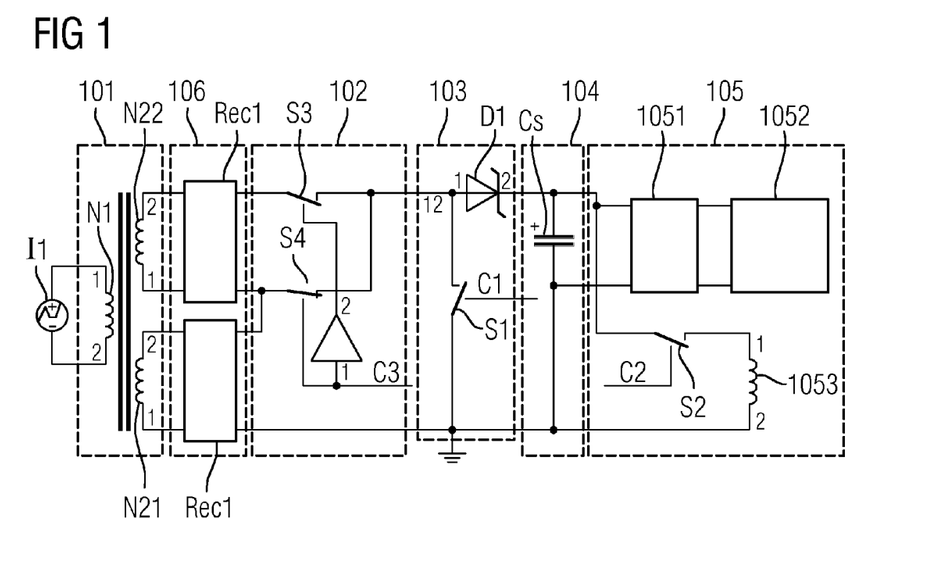
FIG. 1 shows a schematic diagram of the composition structure of a power supply device according to an embodiment of the present invention.

FIG. 1 shows a schematic diagram of the composition structure of a power supply device according to an embodiment of the present invention. In this embodiment, the power supply device includes a current transformer 101, a rectifying module 106, a winding selector 102, a current bypass module 103 and an energy storage capacitor 104. Among them, the rectifying module 106 is disposed between the current transformer 101 and the winding selector 102, the winding selector 102 is disposed between the rectifying module 106 and the current bypass module 103, and the current bypass module 103 is disposed between the winding selector 102 and the energy storage capacitor 104. In the current transformer 101, the current of the primary winding is I1 and its number of turns is N1, the two secondary windings with the output current thereof being I2 are connected in series and their numbers of turns respectively are N21 and N22; herein the two secondary windings can respectively be represented as their numbers of turns N21 and N22. The rectifying module 106 includes a rectifier 1 (Rec1) connected to the secondary winding N22 and a rectifier 2 (Rec2) connected to the secondary winding N21. The winding selector 102 at least includes two switches S3 and S4; and the current bypass module 103 controlled by a control signal C1 at least includes a switch S1. A main circuit 105 at least includes a voltage regulator 1051, a signal processing circuit 1052 and an actuator control circuit 1053. The voltage regulator 1051 draws a voltage from the output voltage of the energy storage capacitor 104 so as to supply power to the signal processing circuit 1052, and the energy storage capacitor 104 also supplies power to the actuator control circuit 1053. Herein, since the actuator control circuit 1053 is not always in the operating state, it also has a switch S2 used for controlling the ON and OFF of the actuator control circuit 1053 according to a control signal C2.

The working principle of the power supply device shown in FIG. 1 will be described in detail in conjunction with FIGS. 2 and 3 hereinafter.

Figure 2:
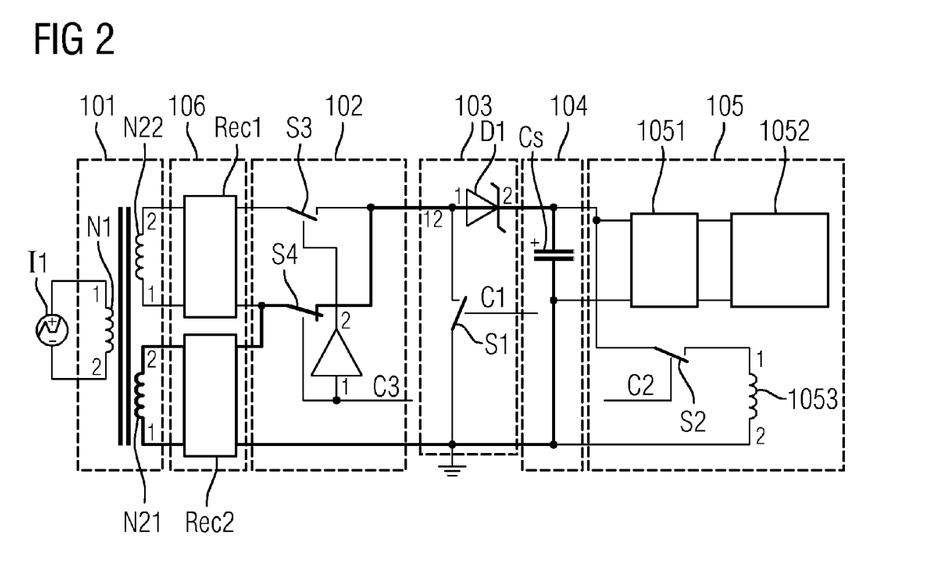
FIG. 2 shows a state diagram of the power supply device shown in FIG. 1 when the electronic equipment is activated.

FIG. 2 shows a state diagram of the power supply device shown in FIG. 1 when an electronic protection device is activated. As shown in FIG. 2, when the electronic protection device is activated, since it requires a relatively large current, a relatively small number of turns of the secondary winding needs to be selected. Therefore, a switch S3 is off and a switch S4 is on according to a control signal C3, which further disconnects the current output path T22 of the secondary winding N22 and the rectifier 1, referring to the circuit indicated by a thick line in FIG. 2. At this moment, the current I2 is output from the secondary winding N21 via the rectifier 2 to the energy storage capacitor 104, and at this moment, the output current I2 is so large that the output voltage of the energy storage capacitor 104 is rather high, which can satisfy the demand for activating the electronic protection device. Herein, it should be noted that in the present document "a switch is off" means that the switch is disconnected, and "a switch is on" means that the switch is connected.

Figure 3:
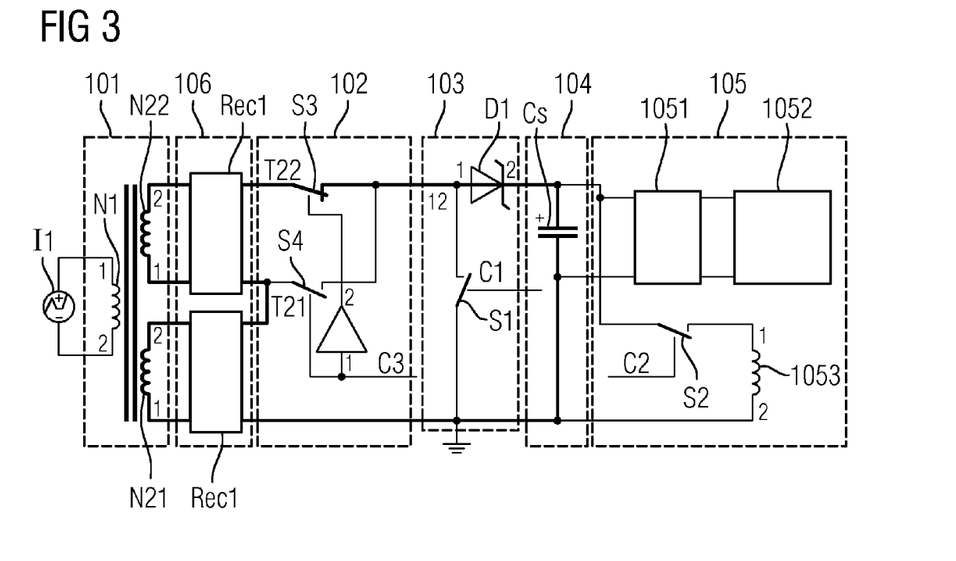
FIG. 3 shows a state diagram of the power supply device shown in FIG. 1 after the electronic equipment enters the normal operating state.

FIG. 3 shows a state diagram of the power supply device shown in FIG. 1 after the electronic protection device enters the normal operating state. As shown in FIG. 3, when the electronic protection device enters the normal operating state, the needed working current is reduced; at this moment, the switch S3 is on and the switch S4 is off according to the control signal C3, which further connects the secondary windings N22 and N21 in series to output a current I2; after being respectively processed by the rectifier 1 and rectifier 2, the current I2 is output to the energy storage capacitor 104, and at this moment, the output current I2 is so small that the output voltage of the energy storage capacitor 104 is rather low, which not only can satisfy the demand for activating the electronic protection device but also can avoid the waste of electrical energy.

In addition, after the electronic protection device enters the normal operating state, the case of inrush overload may also occur, in this case, the actuator control circuit 1053 in the electronic protection device needs a relatively high electrical energy to perform protective functions, such as tripping, etc.; at this moment, the power supply device shown in FIG. 3 can be recovered to the state shown in FIG. 2 to disconnect the secondary winding N22 and rectifier 1 from the whole circuit, then the current I2 is output from the secondary winding N21 via the rectifier 2 to the energy storage capacitor 104; at this moment, the output current I2 is increased, which increases the output voltage of the energy storage capacitor 104 so as to satisfy the demand for performing tripping by the electronic protection device.

It can be known from the operating principles described above that the on/off states of the switches S3 and S4 in the winding selector 102 are always opposed, thus when the control signal C3 is used to control the states of the two switches, a path of control signal C3 can be divided into two paths respectively connected to the switches S3 and S4, and an inverting amplifier is connected in one of the paths, so that a path of control signal C3 emitted can provide opposed signals to the switches S3 and S4 simultaneously, so as to allow the switches S3 and S4 always to be in opposed on/off states. As shown in FIG. 1, an inverting amplifier is connected in the line in which the control signal C3 is connected to the switch S3. Of course, two separate paths of control signal can also be used to provide two opposed signals for the switches S3 and S4, and then an inverting amplifier is no longer needed. Based on the above operating principles, the winding selector 102 would have a number of implementations, which will not be described here one by one, but all of them fall within the scope of protection of the present invention. Here, the control signal C3 is generated in response to the operating state of the electronic equipment.

In FIGS. 2 and 3, the switch S1 in the current bypass module 103 is switched off in the default state, in turn the current output by the secondary winding can be transported to the energy storage capacitor 104, the switch S1 can be switched on according to the control signal C1, and in turn a bypass channel is formed, so that the energy storage capacitor 104 is short-circuited, and the current output by the secondary winding passes through this bypass channel rather than the energy storage capacitor 104; correspondingly, the switch S1 can also be switched off according to the control signal C1, and in turn the bypass channel is cut off, so that the energy storage capacitor 104 is not short-circuited, and the current output by the secondary winding would pass through the energy storage capacitor 104. As such, when the output voltage of the energy storage capacitor 104 reaches a predetermined threshold, the switch S1 can be switched on by means of the control signal C1 and in turn the charging of the energy storage capacitor 104 is stopped so as to decrease the output voltage of the energy storage capacitor 104; and when the output voltage of the energy storage capacitor 104 is below a predetermined threshold, the switch S1 can be switched off by means of the control signal C1 and in turn the charging of the energy storage capacitor 104 is continued so as to increase the output voltage of the energy storage capacitor 104. Here, the predetermined threshold for the output voltage of the energy storage capacitor 104 can be determined according to the particular implementation of the electronic protection device, and the particular value of the predetermined threshold is not limited in the present invention.

It is to be explained that when the electronic protection device is activated and enters the normal operating state, the voltage regulator 1051 draws a voltage from the output voltage of the energy storage capacitor 104 to supply power to the signal processing circuit 1052 which can achieve the functions of current sampling and detecting, etc.; when an inrush overload occurs to the electronic protection device, the switch S2 can be switched on according to the control signal C2, so that the energy storage capacitor 104 is in parallel to the signal processing circuit 1052 and the actuator control circuit 1053, then the output voltage of the energy storage capacitor 104 supplies power to the signal processing circuit 1052 and the actuator control circuit 1053 simultaneously, so as to execute the tripping function, wherein the signal processing circuit 1052 executes the tripping function, and the actuator control circuit 1053 controls the action of the actuator. Here, the functions achieved by each of the portions in the main circuit 105 of the electronic protection device belong to the prior art, which will not be described here in detail; for different electronic protection devices, the compositions of the main circuits thereof may also vary, but the power supply devices provided in the embodiments of the present invention can be used to supply power to the main circuits thereof.

The technical effects of the power supply devices proposed in the embodiments of the present invention will be described hereinafter in conjunction with the following equation (1):

$$I_1 N_1 \approx I_2 N_2 \qquad (1)$$

where I1 is the output current of the primary winding, N1 is the number of turns of the primary winding, I2 is the output current of the secondary winding, and N2 is the number of turns of the secondary winding.

It can be known to those skilled in the art from the above equation (1) that when the output current I1 of the primary winding is constant, the output current I2 of the secondary winding is directly proportional to the ratio of the number of turns N1/N2 of the primary winding and the secondary winding. Hence, in the power supply device shown in FIG. 2, the current I2 output by the secondary winding N21 through the rectifier 1 to the energy storage capacitor 104 is equal to I1*N1/N21, and in the power supply device shown in FIG. 3, the current I2 output by the secondary windings N21 and N22 through the rectifiers 1 and 2 to the energy storage capacitor 104 is equal to I1*N1/(N21+N22). Apparently, when the electronic protection device is activated or an inrush overload occurs, for example, the power supply device is in a state as shown in FIG. 2, since the ratio of the number of turns of the primary winding and the secondary winding is relatively high, the current I2 is relatively large, and the output voltage of the energy storage capacitor 104 is rather high, so that the electronic protection device can complete the activation or tripping function within a relatively short time; at the same time, after the electronic protection device enters the normal operating state, the power supply device is in a state as shown in FIG. 3, since the number of turns of the primary winding and the secondary winding are decreased, the current I2 is decreased, and the output voltage of the energy storage capacitor 104 is reduced, which not only can meet the needs of the normal operation of the electronic protection device but also can avoid the waste of electrical energy.

It is to be explained that in the embodiments of the present invention, the particular values for the number of turns of the primary winding and secondary winding and the ratio of the number of turns therebetween, such as the values for N1, N21, N22, N1/N21 and N1/(N21+N22) in the above embodiments, can be set according to the electrical energy requirements of each functional circuit in the electronic protection device, however, the particular values for the number of turns and the ratio of the number of turns are not limited in the present invention.

In another inventive embodiment of the present invention, the power supply device at least includes: a current transformer with a three-lead secondary winding, a rectifying module, an energy storage capacitor and a winding selector. In this case, the winding selector is disposed between the current transformer and the rectifying module, the rectifying module is disposed between the winding selector and the energy storage capacitor, and the winding selector is connected to the three leads of the secondary winding, with the three leads dividing the secondary winding into two portions. When the electronic protection device is activated, the winding selector allows one of the two portions of the secondary winding to output an electrical current, with the current output by the one of the two portions of the secondary winding activating the energy storage capacitor and starting to charge the energy storage capacitor, and at this moment, the output voltage of the energy storage capacitor is rather high and can meet the needs of the activation of the electronic protection device; when the electronic protection device enters the normal operating state after being activated, the winding selector allows the two portions of the secondary winding to connect together in series to output the current, wherein the current output by the two portions connected in series can continue to charge the energy storage capacitor, and at this moment, the output voltage of the energy storage capacitor would be decreased. In addition, after the electronic protection device enters the normal operating state, an inrush overload may occur, in which case, the electronic protection device needs a relatively high electrical energy to execute the tripping function, etc., and at this moment, the winding selector can again allow one of the two portions of the secondary winding to output the current, which can increase the output voltage of the energy storage capacitor, so as to meet the requirements of executing the tripping function.

The above winding selector can include two switches, the above rectifying module includes a rectifier disposed between the two switches and the energy storage capacitor, for rectifying the output current of the secondary winding, and the two switches are used for allowing one of the two portions of the secondary winding to output a current to the energy storage capacitor or allow the two portions of the secondary winding to connect together in series to output the current.

The above power supply device can further include a current bypass module disposed between the above rectifying module and the above energy storage capacitor, and the function of the current bypass module has been described above in detail, which will not be described here redundantly.

Figure 4:
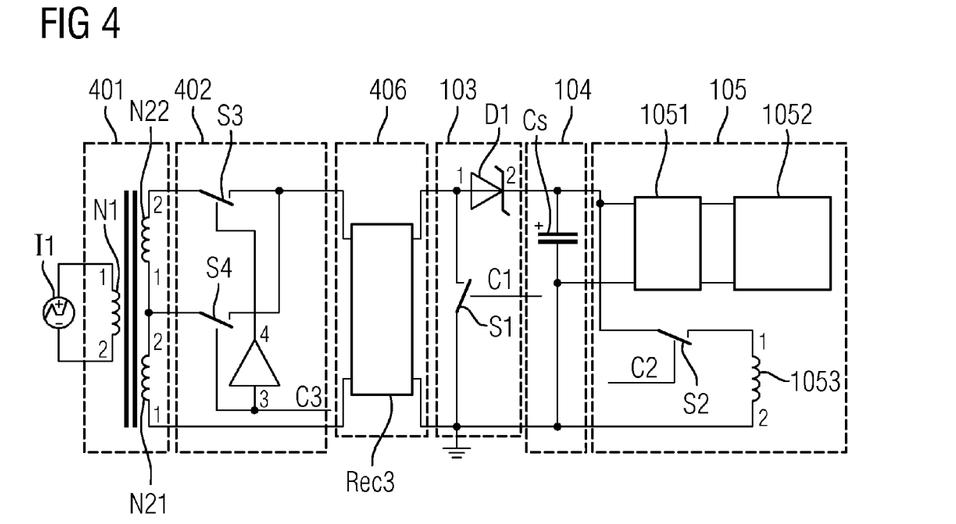
FIG. 4 shows a schematic diagram of the composition structure of a power supply device according to another embodiment of the present invention.

FIG. 4 is a schematic diagram of the composition structure of a power supply device according to yet another embodiment of the present invention. In this embodiment, the power supply device includes a current transformer 401, a winding selector 402, a rectifying module 406, a current bypass module 103 and an energy storage capacitor 104. Among them, the winding selector 402 is disposed between the current transformer 401 and the rectifying module 406, the current bypass module 103 is disposed between the rectifying module 406 and the energy storage capacitor 104; in the current transformer 401, the current of the primary winding is I1, and the number of turns thereof is N1, the two portions of the secondary winding have a number of turns of N21 and N22 respectively, and the current output by the secondary winding is I2; herein, the two portions of the secondary winding can be denoted by their numbers of turns N21 and N22 respectively; and the winding selector 402 at least includes two switches S3 and S4, and the rectifying module 406 includes a rectifier 3 (Rec3). In FIG. 4, the current bypass module 103, energy storage capacitor 104 and main circuit 105 are the same as those in FIGS. 1-3, which will not be described here redundantly.

The operating principles of the power supply device shown in FIG. 4 will be described in detail hereinafter.

When the electronic protection device is activated, the switch S3 is switched off and the switch S4 is switched on according to the control signal C3, so that one of the two portions of the secondary winding, i.e. N22, is cut off from the whole circuit; at this moment, the other portion N21 of the secondary winding outputs a current I2 through the rectifier 3 to the energy storage capacitor 104, at which time the output current I2 is rather high, so that the output voltage of the energy storage capacitor 104 is relatively high, which can meet the requirements of the activation of the electronic protection device.

After the electronic protection device enters the normal operating state, the switch S3 is switched on and the switch S4 is switched off according to the control signal C3, in turn allowing the two portions N22 and N21 of the secondary winding to connect together in series to output the current I2 which is processed by the rectifier 3 and then output to the energy storage capacitor 104, at which time the output current I2 is rather low, so that the output voltage of the energy storage capacitor 104 is relatively low, which can not only meet the operation requirements of the electronic protection device, but also can avoid the waste of electrical energy.

In addition, after the electronic protection device enters the normal operating state, an inrush overload may occur, in which case, the actuator control circuit 1053 in the electronic protection device needs a relatively high electrical energy to execute the tripping function, etc., and at this moment, the power supply device is restored to the state when the electronic protection device was activated (i.e. the switch is switched S3 off, and the switch S4 is switched on), so as to allow one of the two portions of the secondary winding, i.e. N22, to cut off from the whole circuit, and the other portion N21 of the secondary winding outputs a current I2 through the rectifier 3 to the energy storage capacitor 104, at which time the output current I2 becomes bigger, so that the output voltage of the energy storage capacitor 104 is increased, so as to meet the requirements of the electronic protection device for executing the tripping function.

It can be known from the operating principles described above that the on/off states of the switches S3 and S4 in the winding selector 402 are always opposed, and thus when the control signal C3 is used to control the states of the two switches, a path of control signal C3 can be divided into two paths respectively connected to the switches S3 and S4, and an inverting amplifier is connected in one of the paths, so that a path of control signal C3 emitted can provide opposed signals to the switches S3 and S4 simultaneously, so as to allow the switches S3 and S4 always to be in opposed on/off states. As shown in FIG. 4, an inverting amplifier is connected in the line in which the control signal C3 is connected to the switch S3. Based on the above operating principles, the winding selector 402 would have a number of implementations, which will not be described here one by one, but all of them fall within the scope of protection of the present invention.

The technical effects brought by the power supply device shown in FIG. 4 above are the same as those of the power supply device shown in FIG. 1, which will not be described here redundantly.

Figure 5:
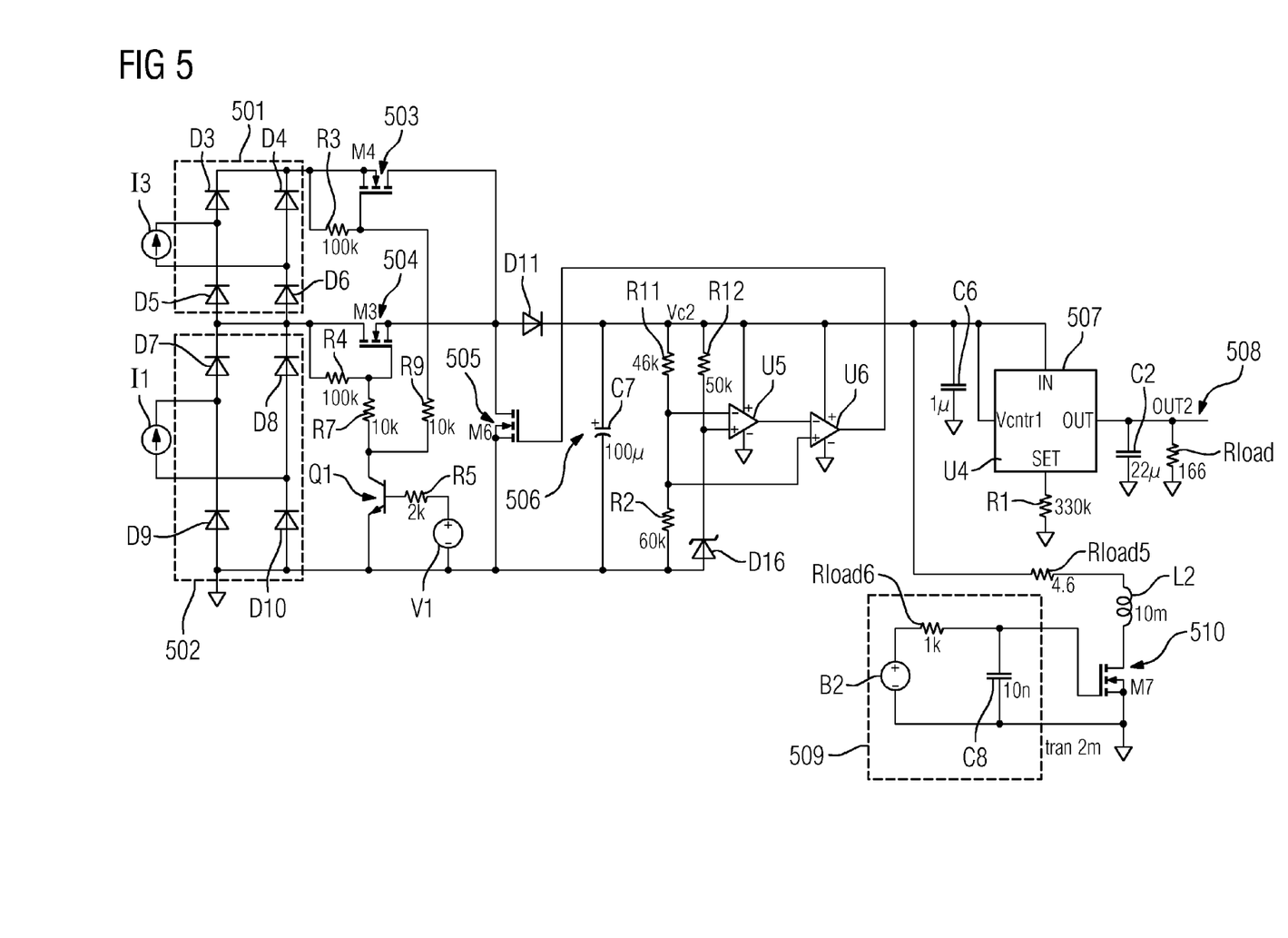
FIG. 5 shows a schematic diagram of the composition structure of a power supply device according to an embodiment of the present invention.

FIG. 5 shows a schematic diagram of the composition structure of a power supply device according to an embodiment of the present invention, the implementation of which power supply device is based on the structure of the power supply device shown in FIG. 1, including: a current transformer, a rectifying module, a winding selector, a current bypass module, and an energy storage capacitor, with the current transformer including the secondary winding of N21 and N22 not shown in FIG. 5. In this case, the rectifying module includes a rectifier 501 (equivalent to the rectifier 1 in FIG. 1) connected to the secondary winding N22, a rectifier 502 (equivalent to the rectifier 2 in FIG. 1) connected to the secondary winding N21; the winding selector includes a metal oxide semiconductor field effect transistor (MOSFET) 503 (equivalent to the switch S3 in FIG. 1), and an MOSFET 504 (equivalent to the switch S4 in FIG. 1); the current bypass module includes an MOSFET 505 (equivalent to the switch S1 in FIG. 1); and the energy storage capacitor includes a capacitor 506. The voltage regulator 507 in the electronic protection device can draw a voltage from the output voltage of the energy storage capacitor to supply power to a load, such as resistor (Rload) 508, with this Rload 508 being equivalent to the signal processing circuit in FIG. 1. In addition, when the MOSFET 510 (equivalent to the switch S2 in FIG. 1) is switched on, the output voltage of the energy storage capacitor can also supply power to the circuit 509, which circuit 509 is equivalent to the actuator control circuit 1053 in FIG. 1.

The operating principles of the device shown in FIG. 5 are similar to those in FIG. 1, and those skilled in the art could understand the operating principles of the device shown in FIG. 5 according to the description above for the device shown in FIG. 1, which will not be described here redundantly.

In order to validate the technical effects brought by the embodiments of the present invention, an emulation experiment using the device shown in FIG. 5. will be explained hereinafter.

Figure 6:
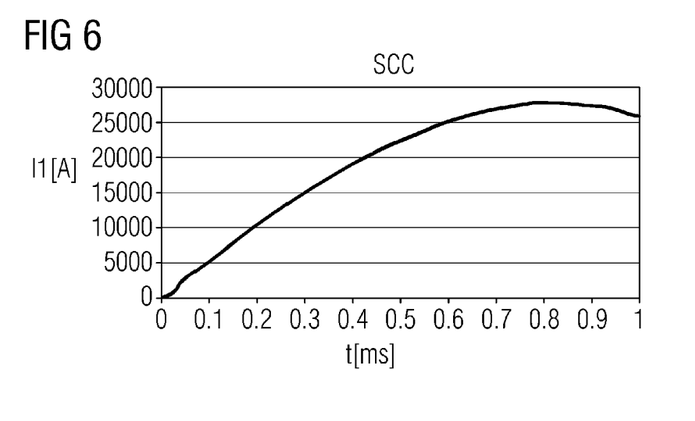
FIG. 6 shows an oscillogram of the short-circuit current in a simulation experiment of the power supply device shown in FIG. 5.
Figure 7:
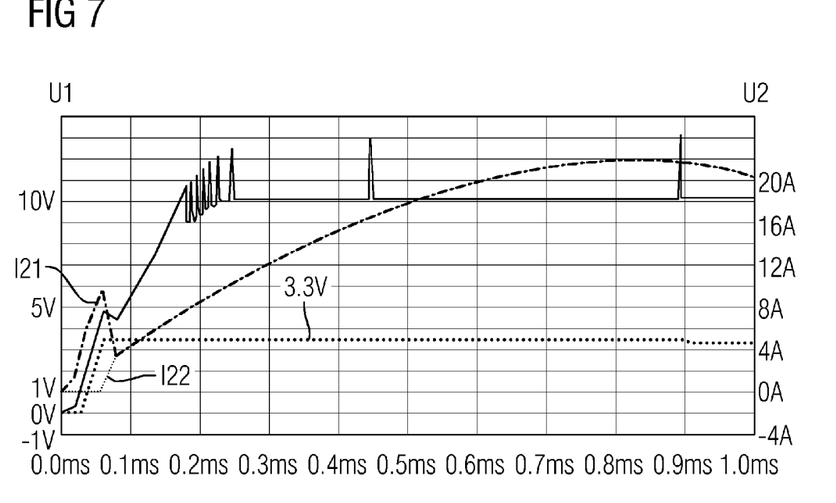
FIG. 7 shows an oscillogram of the simulation result in a simulation experiment of the power supply device shown in FIG. 5.

In this emulation experiment, the number of turns of the primary winding in the current transformer is N1=1, the number of turns of the two secondary winding parts in the current transformer are respectively N21=300 and N22=950; the parameters of the energy storage capacitor are as follows: the electric capacity being 100 μF, the operating voltage being 10 V; and the operating voltage required by the Rload 508 is 3.3 V. In FIG. 6, there is shown a waveform diagram for a short-circuited current SCC measured in the emulation experiment. The short-circuited current SCC in FIG. 6 is the main current I1 output by the primary winding N1. In FIG. 7, there is shown a waveform diagram of the simulation result of the emulation experiment of the power supply device shown in FIG. 5. The values measured shown in FIG. 7 include: I21, I22, U1 and U2, wherein I21 is the output current of the secondary winding N21, I22 is the output current of the secondary winding N22, U1 is the voltage provided for the Rload 508, and U2 is the output voltage of the energy storage capacitor. It is shown in FIG. 7, after activation, I21 is measured first, the current value of I21 is raised by a relatively large magnitude, while I22 has no current value at the beginning, which indicates that the secondary winding N21 outputs a current and the secondary winding N22 is disconnected from the circuit when the Rload 508 is activated; at 0.06 ms, the voltage U1 provided to the Rload 508 reaches 3.3 V, and the value of I21 is raised to a relatively high value at this moment, then the current value of I21 starts to fall, and I22 starts to present a current value, the values of the I21 and I22 are equal to each other after a short time period, and then both of them stay the same and go up by a relatively small magnitude, which indicates that the secondary winding N21 and the secondary winding N22 are connected in series and start to output the current when the Rload 508 enters the normal operating state; and the output voltage U2 of the energy storage capacitor reaches 10 V at 0.18 ms. It is illustrated by the simulation result shown in FIG. 7 above that it takes 0.06 ms to activate the Rload 508 and it takes 0.18 ms to complete the charging of the energy storage capacitor by using the power supply device shown in FIG. 5. When operating normally, it is supposed that the main current of the primary winding is I1=200 A, then the current output by the secondary winding is I2=I1*N1/(N21+N22)=200*1/(300+950)=0.16 A, and the power consumed is P=I2*U2=0.16*10=1.6 W. It can be seen that by using the power supply device provided by the embodiments of the present invention, the time for activating the load and the time for charging the energy storage capacitor are all very short and the power consumed after entering the normal operating state is also relatively low, so that the waste of the electrical energy can be avoided.

By using the various power supply devices provided in the embodiments of the present invention above-mentioned, not only the problems such as the waste of electrical energy, the activation time being long, etc. which occurred in the prior art can be solved, but also the auxiliary supply to be used in the electronic protection devices in the current power distribution systems can be substituted, and it is unnecessary for such electronic protection devices to be equipped with auxiliary supplies after using the power supply device provided in the embodiments of the present invention. For example, after the electric tripping unit (ETU) in the breaker is equipped with the power supply device provided in the embodiments of the present invention, the signal processing circuit thereof can be activated rapidly, so that the short-circuited circuit can be detected by the signal processing circuit in time, and the actuator control circuit in the ETU can be activated rapidly after the short-circuited circuit is detected so that the tripping processing can be completed in time. For another example, the ETU with the zone selective interlocking (ZSI) function can be equipped with the power supply device provided in the embodiments of the present invention, which ETU also receives/sends the interlocking signals from the upstream/downstream breaker via the communicating lines in addition to completing the functions of the traditional ETU such as short-circuited circuit detection, tripping, etc., and therefore, it needs more electrical energy consumption, needs to be activated more rapidly and needs higher electrical energy stability, while the power supply device provided in the embodiments of the present invention can meet these requirements, and it is unnecessary to install auxiliary supplies.

Based on the power supply device mentioned above, a method for supplying power by a power supply device is also proposed in the embodiments of the present invention. As described previously, the power supply device includes at least: a current transformer and an energy storage capacitor with N secondary winding parts connected in series, wherein N is an integral number and N≥2; and the method includes: selectively enabling one or more serially connected winding parts of the N secondary winding parts to output an electrical current, in response to a state signal indicating the operating state of the electronic equipment; and charging the energy storage capacitor by the output current, and supplying power to a main circuit of the electronic equipment.

In an embodiment of the above method, a first number of the secondary winding parts connected in series are enabled to output the current, in response to a first state signal indicating that the electronic equipment is an activated state; and a second number of the secondary winding parts connected in series are enabled to output the current, in response to a second state signal indicating that the electronic equipment is a normal operating state, wherein the first number is smaller than the second number. Furthermore, in an embodiment of the above method, a third number of the secondary winding parts connected in series are enabled to output the current, in response to a third state signal indicating that an inrush overload occurs to the electronic equipment, wherein the third number is smaller than the second number.

The above method can be applied in an electronic protection device, and the main circuit of the electronic protection device includes a signal processing circuit and an actuator control circuit; the method includes: charging the energy storage capacitor by the current output by the first number of secondary winding parts connected in series and activating the signal processing circuit, in response to the first state signal; charging the energy storage capacitor by the current output by the second number of secondary winding parts connected in series and providing an operating voltage to the signal processing circuit, in response to the second state signal; charging the energy storage capacitor by the current output by the third number of secondary winding parts connected in series, activating the actuator control circuit, and providing an operating voltage to the signal processing circuit, in response to the third state signal.

Two particular embodiments of the method mentioned above will be described in detail hereinafter in conjunction with the accompanying drawings.

Figure 8:
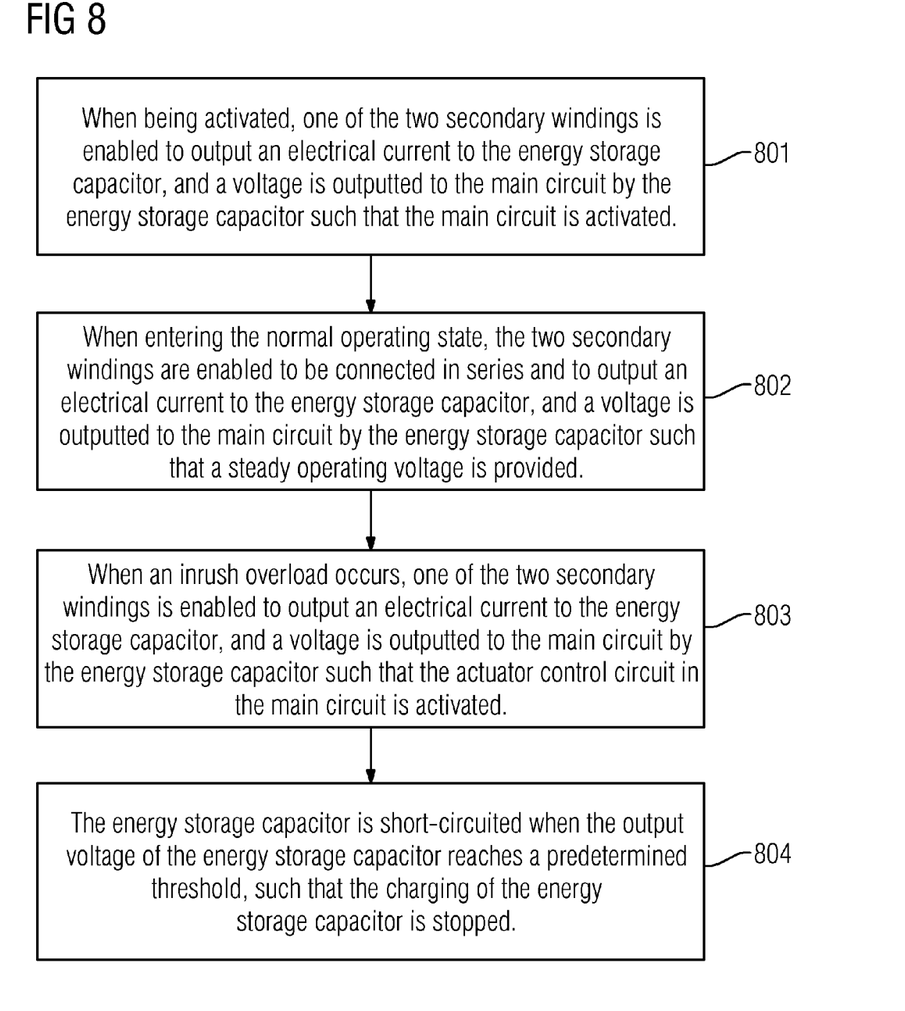
FIG. 8 shows a flow diagram of a method according to an embodiment of the present invention.

The flowchart of the method shown in FIG. 8 is based on the power supply device shown in FIGS. 1 to 3 and FIG. 5 mentioned above, in which the power supply device includes at least: a current transformer and an energy storage capacitor, with the current transformer, for example, having two secondary windings with two leads. As shown in FIG. 8, the method includes the following steps:

Step 801, when the electronic protection device is activated, one of the two secondary windings of the current transformer is enabled to output an electrical current to the energy storage capacitor so that the energy storage capacitor is charged thereby, and a voltage is output to the main circuit of the electronic protection device by the energy storage capacitor so that the signal processing circuit in the main circuit is activated.

Step 802: when the electronic protection device enters the normal operating state, the two secondary windings of the current transformer are enabled to be connected in series and output an electrical current to the energy storage capacitor, and a voltage is output to the main circuit of the electronic protection device by the energy storage capacitor so that a steady operating voltage is provided to the main circuit.

In an embodiment of the present invention, step 803 can also be included, in which, when an inrush overload occurs, one of the two secondary windings of the current transformer is enabled to output an electrical current to the energy storage capacitor, and a voltage is output to the main circuit of the electronic protection device by the energy storage capacitor so that the actuator control circuit in the main circuit is activated and the electronic protection device is enabled to carry out the tripping processing in turn.

In an embodiment of the present invention, step 804 can also be included, in which a bypass channel is connected to render the energy storage capacitor short-circuited when the output voltage of the energy storage capacitor reaches a predetermined threshold, so as to enable the output electrical current of the secondary windings to be no longer output to the energy storage capacitor, so that the charging of the energy storage capacitor is stopped; furthermore, the bypass channel is disconnected to prevent the energy storage capacitor from being short-circuited when the output voltage of the energy storage capacitor is lower than another predetermined threshold, so as to enable the output electrical current of the secondary windings to be output to the energy storage capacitor, so that the energy storage capacitor is charged thereby and the output voltage of the energy storage capacitor is increased.

The abovementioned particular implementing method for each step in FIG. 8 is described in detail in the preceding embodiments, which will not be described here redundantly.

Figure 9:
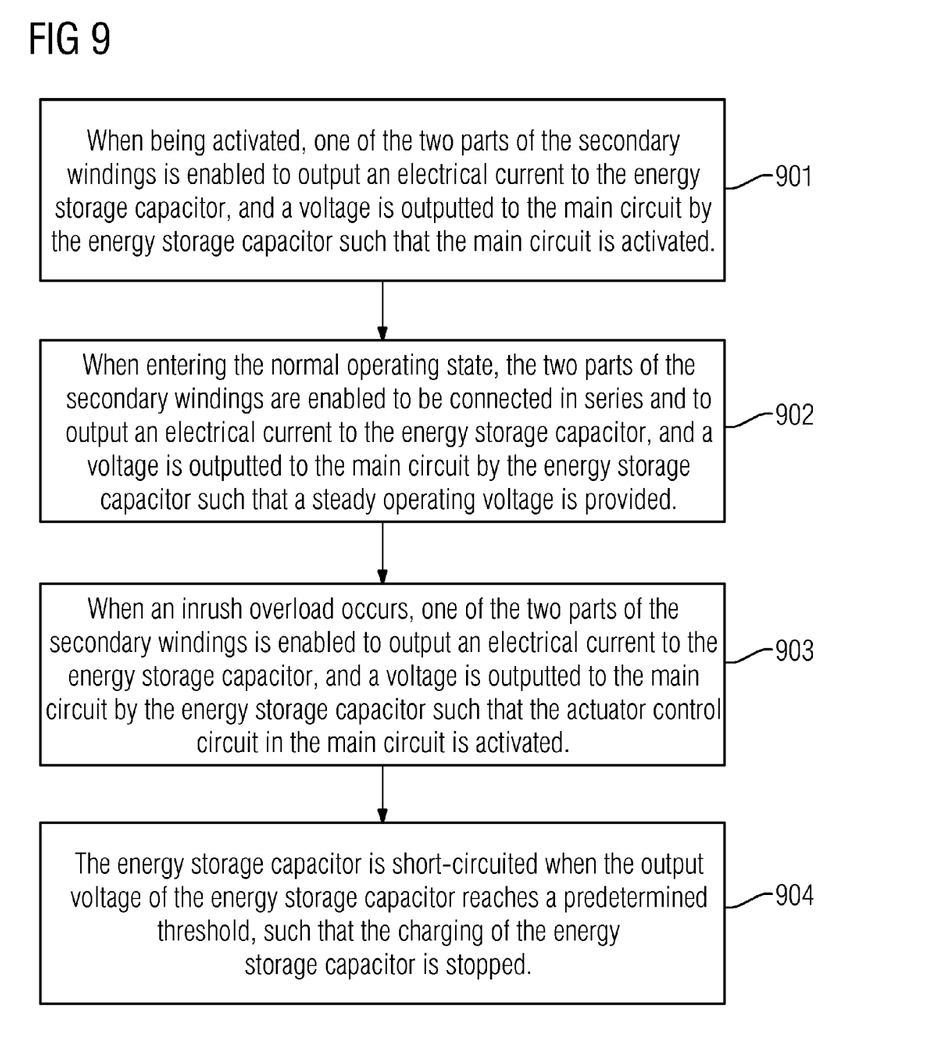
FIG. 9 shows a flow diagram of a method according to another embodiment of the present invention.

The flowchart of the method shown in FIG. 9 is based on the power supply device shown in FIG. 4 mentioned above, in which the power supply device includes at least: a current transformer and an energy storage capacitor, wherein the current transformer has a secondary winding with three leads, and the secondary winding is divided into two parts by the three leads. As shown in FIG. 9, the method includes the following steps:

Step 901: when the electronic protection device is activated, one of the two parts of the secondary winding of the current transformer is enabled to output an electrical current to the energy storage capacitor so that the energy storage capacitor is charged thereby, and a voltage is output to the main circuit of the electronic protection device by the energy storage capacitor so that the signal processing circuit in the main circuit is activated.

Step 902: when the electronic protection device enters the normal operating state, the two parts of the secondary winding of the current transformer are enabled to be connected in series and output an electrical current to the energy storage capacitor, and a voltage is output to the main circuit of the electronic protection device by the energy storage capacitor so that a steady operating voltage is provided to the main circuit.

In an embodiment of the present invention, Step 903: when an inrush overload occurs, one of the two parts of the secondary winding of the current transformer is enabled to output an electrical current to the energy storage capacitor, and a voltage is output to the main circuit of the electronic protection device by the energy storage capacitor so that the actuator control circuit in the main circuit is activated and the electronic protection device is enabled to carry out the tripping processing in turn.

In an embodiment of the present invention, Step 904 can also be included, in which a bypass channel is connected to render the energy storage capacitor short-circuited when the output voltage of the energy storage capacitor reaches a predetermined threshold, so as to enable the output electrical current of the secondary windings to be no longer output to the energy storage capacitor, so that the charging of the energy storage capacitor is stopped; furthermore, the bypass channel is disconnected to prevent the energy storage capacitor from being short-circuited when the output voltage of the energy storage capacitor is lower than another predetermined threshold, so as to enable the output electrical current of the secondary windings to be output to the energy storage capacitor, so that the energy storage capacitor is charged and the output voltage of the energy storage capacitor is increased.

The abovementioned particular implementing method for each step in FIG. 9 is described in detail in the preceding embodiments, which will not be described here redundantly.

Electronic equipment is also proposed in the embodiments of the present invention, which electronic equipment includes: a main circuit and a power supply device provided in the embodiments of the present invention. Such electronic equipment can be various electronic protection devices in the power distribution system. It is preferred that the electronic protection device can be an ETU or an RCD, and the main circuit thereof can include a signal processing circuit and an actuator control circuit.

The present invention also provides a machine readable storage medium for storing instructions which enable a machine to carry out the method for supplying power by the power supply device as described in the present document. Particularly, a system or a device with storage medium can be provided, on which storage medium there are stored software program codes for implementing the functions of any of the above-mentioned embodiments, and a computer (or CPU or MPU) of the system or device is enabled to read and execute the program codes stored in the storage medium.

In this case, the functions of any of the above-mentioned embodiments can be implemented by the program codes per se read from the storage medium, therefore the program codes and the storage medium storing the program codes constitute a part of the present invention.

The embodiments of the storage medium for providing program codes include floppy disk, hard disk, magnetic optical disk, optical disk (such as CD-ROM, CD-R, CD-RW, DVD-ROM, DVD-RAM, DVD-RW, and DVD+RW), magnetic tape, non-volatility storage card, and ROM. Selectively, the program codes can be downloaded from a server computer via a communication network.

Furthermore, it should be apparent that the operating system running on the computer is enabled to complete part of or all of the practical operations not only by implementing the program codes read from the computer but also by the instructions based on the program codes so that the functions of any of the above-mentioned embodiments can be achieved.

Furthermore, it should be understood that the program codes read from the storage medium are written into a memory provided in an expansion board in the computer or written into a memory provided in an expansion unit connected to the computer, and then the CPU mounted onto the expansion board or the expansion unit is enabled to implement part of or all of the practical operations based on the instructions of the program codes, so that the functions of any of the above-mentioned embodiments can be achieved.

A power supply device in electronic equipment is proposed in the embodiments of the present invention, which power supply device includes: a current transformer with N secondary winding parts connected in series, an energy storage capacitor and a winding selector, with N being an integral number and N≥2, wherein the winding selector selectively enables one or more serially connected winding parts of the N secondary winding parts to output an electrical current, in response to a state signal indicating the operating state of the electronic equipment; and the energy storage capacitor is charged by the output current, and supplies power to the main circuit of the electronic equipment. The embodiments of the present invention also provide corresponding electronic equipment and a corresponding method. By way of the embodiments of the present invention, it is possible to supply electrical energy at relatively low power loss.

What are described above are merely preferred embodiments of the present invention, and are not to limit the present invention, and any modifications, equivalents and improvements within the spirit and principle of the present invention should be covered by the protection scope of the present invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. Power supply device for a main circuit of an electronic equipment, comprising:
   a current transformer with secondary windings connected in series;
   a winding selector configured to select one or more of the secondary windings to output a current in response to a state signal indicating a working state of the electronic equipment; and
   a storage capacitor configured to be charged by the current output by the selected secondary windings to supply power for the main circuit,
   wherein the winding selector is configured to select a first number of the secondary windings to output the current in response to a first state signal indicating a start state of the electronic equipment, and
   wherein the winding selector is configured to select a second number of the secondary windings to output the current in response to a second state signal indicating a normal operation state of the electronic equipment, the first number being less than the second number.

2. The power supply device of claim 1, wherein, the winding selector is configured to select a third number of the secondary windings to output the current in response to a third state signal indicating an inrush overload of the electronic equipment, the third number being less than the second number.

3. The power supply device of claim 1, further comprising:
   a current bypass module configured to connect a bypass channel to short-circuit the storage capacitor when the output voltage of the storage capacitor reaches a threshold value to stop charging the storage capacitor using the output current.

4. The power supply device of claim 3, wherein, the current bypass module is configured to disconnect the bypass channel to not short-circuit the storage capacitor when the output voltage of the storage capacitor is lower than another threshold value to continue charging the storage capacitor using the output current.

5. A power supply device for a main circuit of an electronic equipment, comprising:
   a current transformer with secondary windings connected in series;
   a winding selector configured to select one or more of the secondary windings to output a current in response to a state signal indicating a working state of the electronic equipment; and
   a storage capacitor configured to be charged by the current output by selected secondary windings to supply power for the main circuit, wherein a total number of the secondary windings are series connected from the first secondary winding to the Nth secondary winding,
   wherein there are M current output paths and a first current output path in the M current output paths is coupled to the current output end of the Nth secondary winding,
   wherein M−1 second current output paths in the M current output paths are coupled to the M−1 joint points in the N−1 joint points of neighboring secondary windings, wherein M is an integer equal to or greater than 2 and equal to or less than N, and
   wherein the winding selector is configured to select one path in the M current output paths to output the current in response to the state signal.

6. The power supply device of claim 5, wherein, the winding selector includes M switches; each switch being set on one path in M current output paths only one switch connecting at the same time.

7. A method for supplying power for the electronic equipment via a power supply device, the power supply device including a current transformer and a storage capacitor, the current transformer including N secondary windings connected in series, N being an integer equal to or greater than 2, the method comprising:
   selecting one or more windings in series from the N secondary windings to output current in response to a state signal indicating a working state of the electronic equipment; and
   charging the storage capacitor by the current output by the selected secondary windings, and supplying power for a main circuit of the electronic equipment using the charged storage capacitor, wherein,
   the selecting selects a first number of the secondary windings to output the current in response to a first state signal indicating a start state of the electronic equipment, and
   the selecting selects a second number of the secondary windings to output the current in response to a second state signal indicating a normal operation state of the electronic equipment, the first number being less than the second number.

8. The method of claim 7, wherein the electronic equipment is an electronic protection device, and the main circuit includes a signal processing circuit and an actuator controlling circuit;
   wherein the charging charges the storage capacitor using the current output by the first number of the secondary windings such that the signal process circuit starts in response to the first state signal;
   wherein the charging charges the storage capacitor using the current output by the second number of the secondary windings such that the signal processing circuit is provided with a working voltage in response to the second state signal; and
   wherein the charging charges the storage capacitor using the current output by a third number of the secondary windings such that the actuator control circuit starts and the signal processing circuit is provided with the working voltage in response to the third state signal.

9. The method of claim 7, wherein the power supply device includes:
   a winding selector configured to perform the selecting.

10. The method of claim 8, wherein the power supply device includes:
    a winding selector configured to perform the selecting.

11. A method for supplying power for the electronic equipment via a power supply device, the power supply device including a current transformer and a storage capacitor, the current transformer including N secondary windings connected in series, N being an integer equal to or greater than 2, the method comprising:
    selecting one or more windings in series from the N secondary windings to output current in response to a state signal indicating a working state of the electronic equipment; and
    charging the storage capacitor by the current output by the selected secondary windings; and
    supplying power for a main circuit of the electronic equipment,
    wherein the charging charges the storage capacitor using the current output by the first number of the secondary windings such that the signal process circuit starts in response to the first state signal,
    wherein the charging charges the storage capacitor using the current output by the second number of the secondary windings such that the signal processing circuit is provided with a working voltage in response to the second state signal, and
    wherein the charging charges the storage capacitor using the current output by a third number of the secondary windings such that the actuator control circuit starts and the signal processing circuit is provided with the working voltage in response to the third state signal.

* * * * *